United States Patent [19]

Resh

[11] 3,781,673

[45] Dec. 25, 1973

[54] PACKING ADAPTER FOR TESTING MOIST CHOPPED MATERIALS IN A GRAIN MOISTURE TESTER

[75] Inventor: Roy E. Resh, Bettendorf, Iowa

[73] Assignee: Agridustrial Electronics, Inc., Bettendorf, Iowa

[22] Filed: Mar. 24, 1972

[21] Appl. No.: 237,663

[52] U.S. Cl. ............................................. 324/61 R
[51] Int. Cl. ........................................... G01r 27/26
[58] Field of Search ............ 324/61 R, 61 P, 61 QS, 324/61 QL

[56] References Cited
UNITED STATES PATENTS

| 2,693,575 | 11/1954 | Greenwood et al. | 324/61 R |
| 3,081,429 | 3/1963 | Moe | 324/61 R |
| 3,566,260 | 2/1971 | Johnston | 324/61 R |

Primary Examiner—Stanley T. Krawczewicz
Attorney—Glenn H. Antrim et al.

[57] ABSTRACT

An insulating, frustum-shaped adapter is disposed around the inner cylindrical electrode of a grain moisture tester to provide a desirable, repetitive amount of packing of moist, chopped material and to provide during the testing of moist material with high dielectric constant, capacitance within the range obtained while testing grain.

5 Claims, 3 Drawing Figures

PATENTED DEC 25 1973 3,781,673
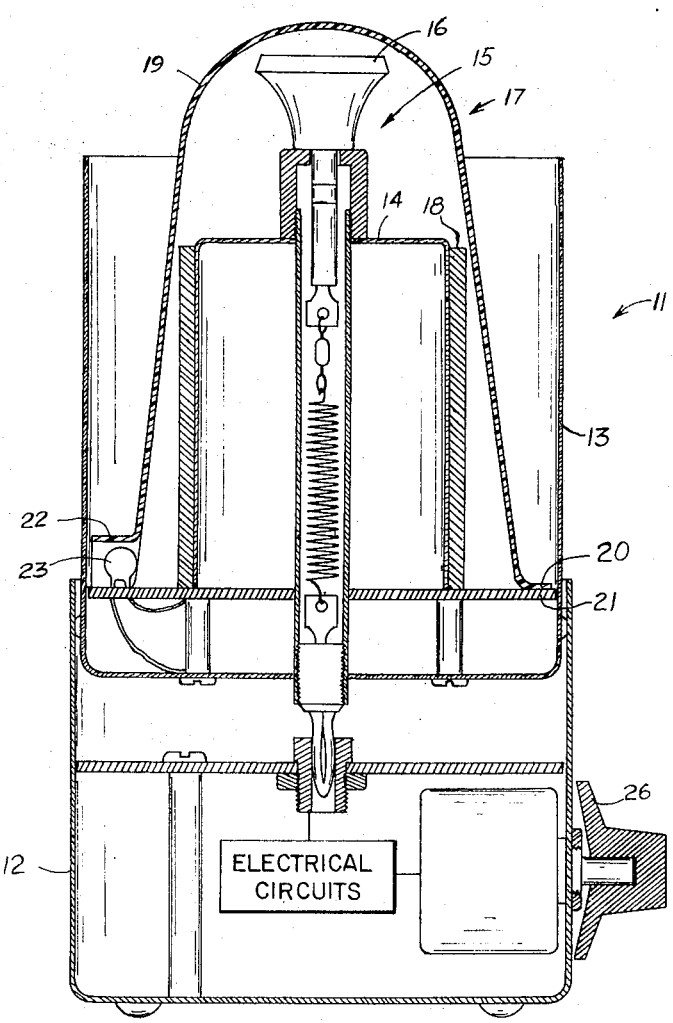
FIG. 2
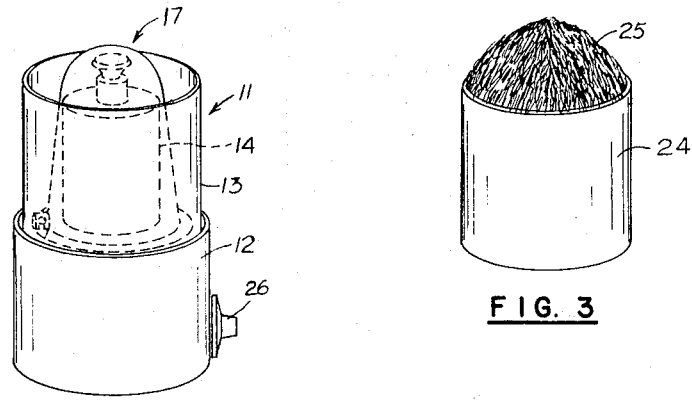
FIG. 1
FIG. 3

PACKING ADAPTER FOR TESTING MOIST CHOPPED MATERIALS IN A GRAIN MOISTURE TESTER

BACKGROUND OF THE INVENTION

This invention relates to testers for measuring permittivity of materials, and particularly to adapters for converting a tester for measuring grain of moderate moisture content to a tester for measuring chopped material of greater moisture content and with different packing characteristics.

The present adapter is described for use particularly with the tester described in U.S. Pat. application Ser. No. 152,186 for a Grain Moisture Tester, filed by Roy E. Resh on June 11, 1971. The assignee of the rights to this invention is the same as the assignee to the rights of the invention described in his former application, and the description of the former application is incorporated by reference into the present application.

According to the Background of Invention of the former application, material to be tested for moisture content must be packed consistently between electrodes for test cells such that the mass of the same material is the same for successive tests. According to U.S. Pat. No. 2,251,641 issued to F.W. Stein on Aug. 5, 1941, a loading device having a hinged cover for a bottom is used to measure materials, and the cover is unlatched to fill a test cell that is positioned below the loading device. A separate loading funnel is described in U.S. Pat. No. 2,693,575 issued to K.M. Greenwood et al on Nov. 2, 1954, and a central electrode of the test cell is cone-shaped to alleviate the concentration of electric field at the lower portions of the cell as a result of packing. Other testers use separate spring scales for weighing only a separate hopper to determine the amount of material to be conveyed from the hopper to the test cell. Likewise, the tester that is described in the application that is incorporated by reference herein uses a spring scale to measure the amount of material placed in the test cell, but it has an integral spring scale partially enclosed by the central electrode of the cell, and loading merely requires the pouring of the material to be tested directly into the cell while the entire cell and an attached measuring circuit are supported and weighed by a spring scale.

As described in the incorporated reference, the test cell comprises an outer aluminum container and a coaxial inner electrode extending upwardly from an insulated bottom in the container. The inner electrode contains a spring scale for weighing the entire tester and a sample while it is being poured into the cell. An electrical circuit is contained in a lower container attached to the test cell, and the circuit is used to measure the capacitance between the inner electrode and the cylindrical wall of its container. The reading of the measured capacitance is converted to moisture of a particular material by reference to a chart. Since the correct calibration of the tester requires compensation for change in temperature, a temperature-compensating capacitor is connected across the cell and is mounted directly in the bottom of the cell to be in contact with the material that is being tested.

SUMMARY OF THE INVENTION

An object of this invention is to provide a tester having a container of suitable configuration to obtain desirable packing of moist, chopped materials and to measure the material by volume measurement in preparation for obtaining a capacitive reading to indicate permittivity according to the moisture content of the material.

Another object of this invention is to provide an adapter to convert a grain moisture tester of the capacitive type to a tester for measuring moisture content of moist materials such as green, chopped fodder and silage.

The adapter has a frustum-shaped portion that fits over the inner cylindrical electrode of a cylindrical, capacitive type test cell. Near the top of the test cell, the wall of the adapter is close to the inner electrode to leave nearly the normal amount of space between the inner electrode and the outer electrode, and in a downward direction the spacing between the outer electrode and the adapter decreases while the spacing between the adapter and the inner electrode increases. The material to be tested is placed between the wall of the adapter and the outer electrode, and the downwardly, slanting direction of the adapter relative to the outer electrode aids in packing green, chopped materials uniformly for successive tests, and by decreasing the mass of material adjacent the inner electrode, especially near the bottom of the test cell, the range of calibration of the instrument for grain becomes suitable for measuring moist, chopped materials such as green feed and silage.

BRIEF DESCRIPTION OF THE DRAWING

FIG. 1 is a top oblique view of a cylindrical grain moisture tester with an insulating frustum over the center electrode of the tester to adapt it for measuring green, chopped materials;

FIG. 2 is a diametral, vertical cross-section of the assembled grain moisture tester with the adapter according to the present invention in place; and FIG. 3 is a top oblique view of a measuring container filled with chopped, green material.

DESCRIPTION OF THE PREFERRED EMBODIMENT

The grain moisture tester shown in FIG. 1 has two aluminum cylindrical containers that function as a base 12 and a test cell 11. The diameters of the containers differ enough to provide a tight fit as the bottom portion of the test cell 11 is pressed into the top portion of the base 12. The vertical wall 13 of the test cell 11 is the outer electrode, and the inner electrode 14 is an aluminum container mounted coaxially within the wall 13. Electrical circuits for determining capacitance between the electrodes are mounted in the base 12.

A spring scale 15, as shown in FIG. 2, has a scale that extends upwardly from the axis of the inner electrode 14. When the tester is used to test the moisture content of grain, the adapter 17 is removed, and a predetermined amount of grain is placed between the inner electrode 14 and the wall or outer electrode 13. To facilitate the measurement of the amount of grain to be added to the cell, a spring scale 15 is mounted coaxially within the inner electrode 14. In order for the measurement of permittivity to be accurate, the amount of material added to the cell 11 must be a specific amount for which the electrical circuits are calibrated, and also the material must be packed for every sample in about the same manner. Since the grain moisture tester is compact and the containers and electrodes are aluminum, the complete tester is light enough to permit the accurate determination of the amount of sample by simply weighing the sample and the complete tester together. The tester is filled while supporting it by the handle 16 of the spring scale 15 as material to be tested is added until a selected calibration mark appears on the scale. Obviously, after a test reading, the tester is inverted to pour out the sample.

The accuracy of the reading for moisture content is dependent upon the evenness of the packing of the material to be tested, and particularly upon the packing close to the inner electrode 14. While the tester is being used to test the moisture of grain, the grain is maintained a fixed distance from the conductive surface of the inner electrode 14 by a thick layer of insulating material 18 that has a dielectric constant not much greater than one and that covers the outer surface of the inner electrode 14.

The use of the grain moisture tester without the adapter 17 for measuring the moisture content of moist, chopped food is impractical for at least two reasons. Although many different types of granular materials pack satisfactorily between the vertical walls of the inner electrode 14 and the outer wall 13, moist materials such as green, chopped feeds require a space of different geometry to pack satisfactorily. Also, if moist materials were packed between these vertical walls, the electrical test circuits for testing the capacitance between the electrodes would have to be adjusted to test over a different range of values because of the different dielectric constant of the materials. Since the dielectric constant of water is about 80 and green feeds contain much water, the measurement of green feeds that are positioned between the electrodes in the same space used for grain would require a higher reading for capacitance. The use of the adapter 17 having a frustum-shaped portion covering the inner electrode 14 has been found empirically to provide satisfactory packing of green materials that have been chopped into about ½-inch pieces; and since the moist material to be tested is spaced from the inner electrode 14 especially at the bottom of the electrode to leave air for a dielectric, the reading for the material is within the range for measuring the moisture content of grain that is measured without the use of the adapter 17.

The adapter has a closed top or dome 19 over its frustum-shaped portion. The shape of the upper portion is not critical, and the shape shown is desirable to provide a cover for the inner electrode and the spring scale of a particular grain moisture tester. The bottom of the frustum-shaped portion has an outwardly turned flange 20 resting on the upper surface of an insulated bottom 21 of the test cell 11 and extending outwardly almost to the vertical wall 13. A portion of the flange 20 may be raised as shown at the point 22 to provide a small, downwardly facing cavity to cover a small, electrical, temperature-compensating element that is in contact with grain when it is being tested in the test cell. The insulation of the compensating element 23 by the adapter may be desirable, for the element has been chosen with characteristics suitable for use during measurement of grains, and furthermore, temperature compensation is less important for moist materials which soon acquire the same temperature as the ambient temperature. Also, the adapter prevents accumulation of moist material about the temperature-compensating element. In practice, the wall of the adapter is quite close to the upper, outer surface of the inner electrode 14, and the flange 20 of the adapter extends from about one-third to one-half the distance from the outer wall 13 of the test cell 11 to the inner electrode 14. The adapter may be molded from insulating materials such as polystyrene or ABS (Acrylonitrile-Butadiene-Styrene) material.

To use the test cell 11 for testing moist, chopped material rather than grain, the adapter 17 is placed over the inner electrode 14, and volume measurement rather than weight by the spring scale 15 is used to determine the quantity of chopped material. The material is chopped into bits that have dimensions no greater than one-half inch, and then the material 25 is poured loosely directly into the test cell or into the container 24 (FIG. 3) until either the container or the test cell is overfilled such that the amount of the material 25 extends above the top of the container 24 or the top of the test cell. If the container 24 is used, the material is poured evenly about the adapter 17 to fill the space between the outer surface of the adapter 17 and the inner surface of the vertical wall 13 of the test cell 11. Then, a reading of capacitance between the inner electrode 14 and the outer electrode 13 is obtained for indicating the moisture content of the moist, chopped material. For example, a reading may be obtained from the calibrated knob 26, and then by use of a chart, the reading is converted to moisture content for the type of material being tested.

I claim:

1. A moisture tester for testing moist, chopped materials comprising:
   an outer cylindrical conductive container having a vertical wall to function as an outer electrode,
   an inner coaxial cylindrical electrode insulated from said outer electrode,
   electrical circuit means connected to said electrodes for measuring capacitance therebetween,
   a dividing wall of insulating material disposed between said electrodes, said dividing wall having a frustum, the small end of said frustum fitting quite closely around the top of said inner electrode and the wall of said frustum extending slantingly downwardly and outwardly between said electrodes to define one volume between said outer electrode and said slanting wall of said frustum for receiving moist, chopped material to be tested, and another volume having low dielectric constant between said slanting wall of said frustum and said inner electrode.

2. A moisture tester as claimed in claim 1 wherein said dividing wall is a removable adapter, said cylindrical electrodes and said electrical circuit means comprise a grain moisture tester, and said other volume of low dielectric constant permits the normal range of capacitive reading of said electrical circuit means to be used for measuring moisture content of moist, chopped materials.

3. A moisture tester as claimed in claim 2 wherein said removable adapter has a flange extending outwardly from the bottom of said frustum portion, said flange extending from said frustum portion to said outer electrode to provide a bottom for said one volume for receiving moist, chopped material.

4. A moisture tester as claimed in claim 3 wherein said grain moisture tester has a bottom of insulating material within said container, a temperature-compensating element protruding upwardly from said bottom into the volume between said electrodes for receiving grain to be tested, the flange of said adapter having a raised portion to form a cavity with a downwardly facing opening to receive said temperature-compensating element as said adapter is positioned over said inner electrode in said grain moisture tester, said raised portion of said flange providing a protective covering over said temperature-compensating element.

5. A moisture tester as claimed in claim 3 having an enclosed portion over the top of said frustum to protect the inner portion of said grain moisture tester.

* * * * *